Patented June 4, 1946

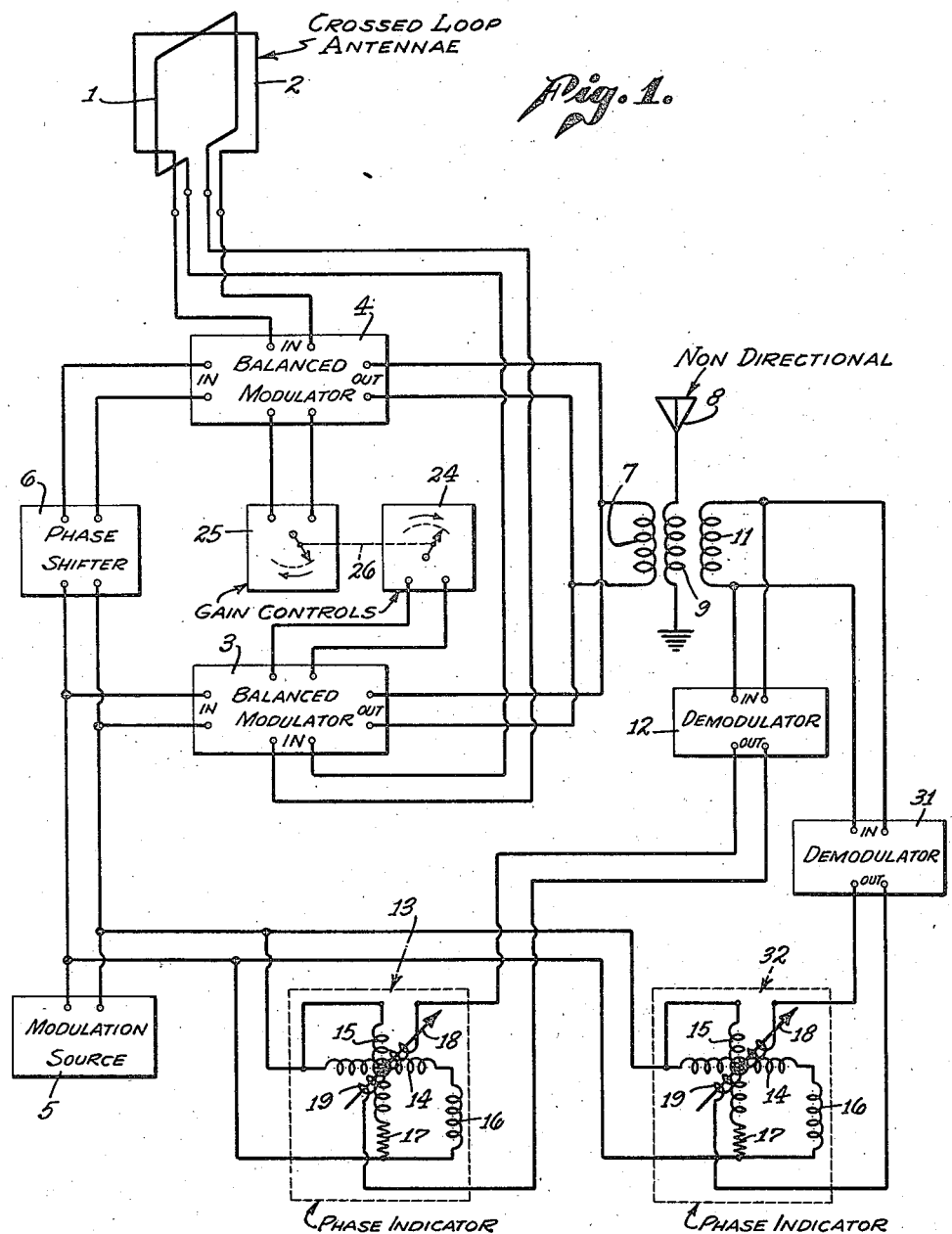

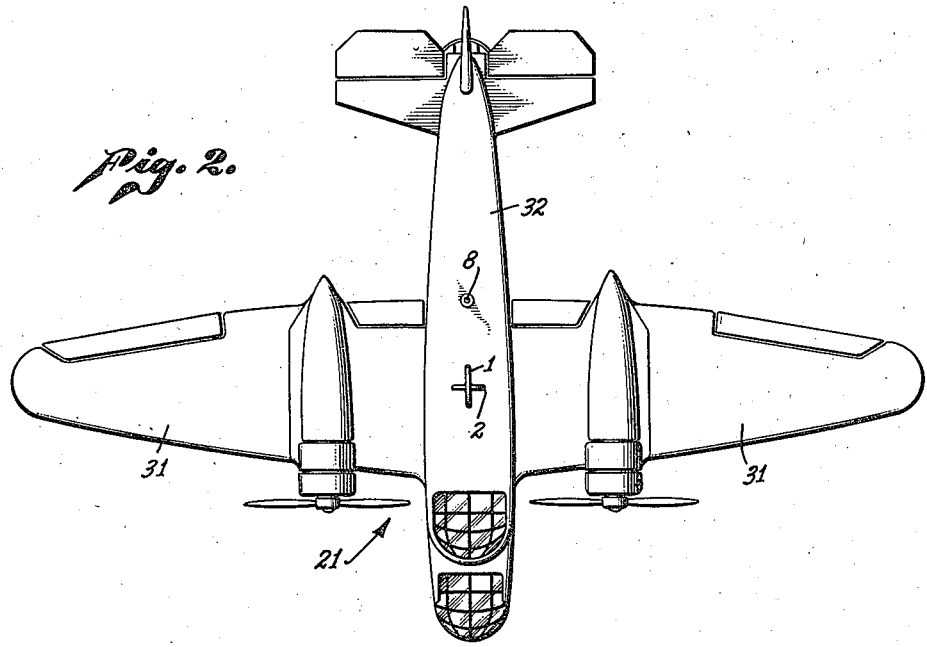
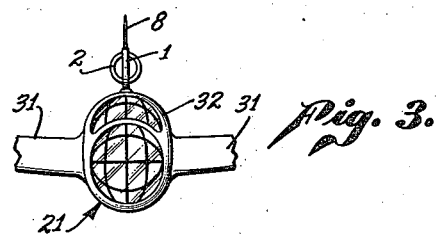
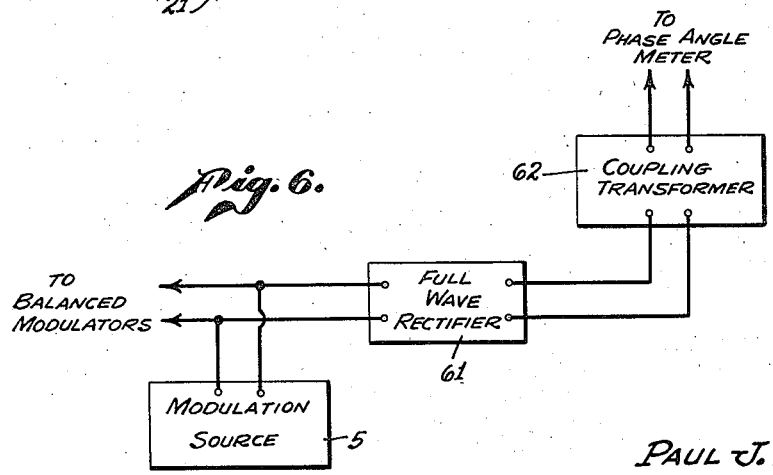

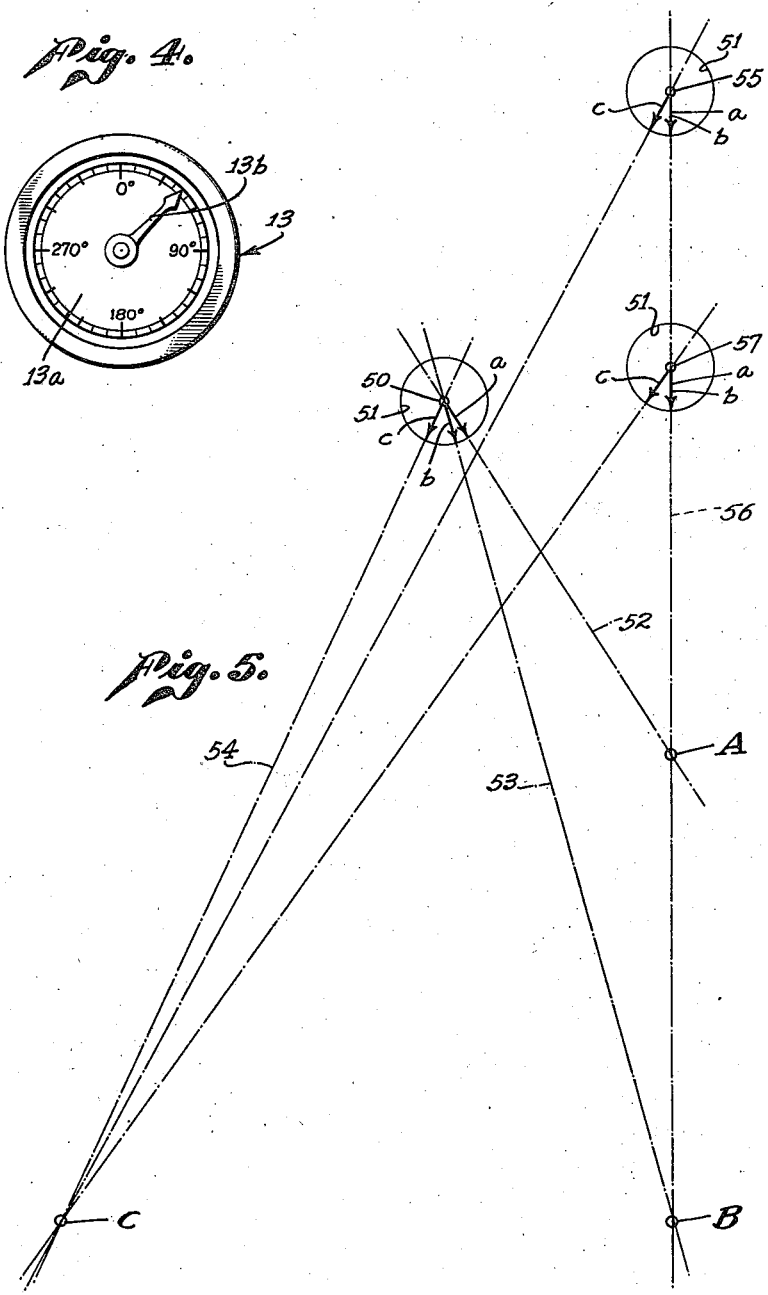

2,401,565

UNITED STATES PATENT OFFICE 2,401,565

RADIO NAVIGATION SYSTEM

Paul J. Holmes, Los Angeles, Calif., assignor of one-half to Richard R. Stoddart, Los Angeles, Calif.

Application May 28, 1941, Serial No. 395,595

8 Claims. (Cl. 250—11)

This invention relates to radio navigation devices for use particularly on mobile objects such as boats or airplanes for determining the position of radiators of radio carrier waves or for navigating a course with respect to one or more radiators of carrier waves. For convenience the invention will be described in connection with an airplane although the teaching may be applied to other mobile bodies unless the context clearly denotes otherwise.

A particular object of the invention is to provide a radio navigation system utilizing stationary directive antennae having differently oriented response patterns, such as loop antennae with their axes crossed at 90°.

A primary object of the invention is to provide a radio navigation system for obtaining simultaneous bearings on a plurality of spaced radiators radiating radio carrier waves of different frequencies.

Another object of this invention is to provide a radio compass system utilizing fixed directional antennae having differently oriented directional characteristics which may be mounted on a metal airplane and which will give indications which are substantially free from error ordinarily produced by the action of the wings and fuselage on incoming radio waves.

Numerous direction finders have been proposed which use stationary directive antennae having differently oriented response patterns, such as loop antennae with their axes crossed at 90°. However, these theoretically superior systems are not in general use and systems using a directional antenna which is mechanically rotated to indicate the location of a transmitting station are most commonly employed. The mechanical rotating of a loop antenna on modern aircraft usually requires considerable flexible shafting, operating motors, relays, saturated reactors, and high-powered amplifiers (usually including gaseous discharge tubes). This increases the weight of the installation considerably and introduces numerous installation and maintenance problems. For example, great care must be taken to prevent bending flexible shafting about a short radius. As another example, difficulty is usually encountered in keeping the flexible shafting lubricated at high altitudes since most greases tend to congeal at low temperatures.

Special mechanical movements are usually required for linking the flexible shafting to the loop antenna so that the directional errors produced by the wings and fuselage can be compensated for. The directional errors produced by the wings and fuselage have probably been the greatest obstacle in the way of preventing the use of crossed stationary loop antennae.

Another object of the invention is to provide a radio compass of the type described having an electro-mechanical indicating means producing unique directional indications as distinguished from indications having a possible 180° ambiguity.

Another important object of the invention is to provide a radio navigation system, for following a line in space passing through a pair of spaced radiators operating at different carrier frequencies.

Further objects and advantages of the invention will be specifically brought out as the description proceeds or will be apparent therefrom.

My invention will be better understood when described in connection with the accompanying drawings, in which:

Fig. 1 is a wiring diagram of a typical radio compass according to my invention;

Fig. 2 is a plan view of a typical all metal airplane on which the apparatus of Fig. 1 may be installed;

Fig. 3 is a partial front elevation of the airplane illustrated in Fig. 2;

Fig. 4 is a front elevation of one of the phase angle indicators illustrated in Fig. 1;

Fig. 5 is a diagrammatic plan view illustrating the practice of the invention in navigation; and Fig. 6 is a partial circuit diagram illustrating a modification.

Referring to Fig. 1 of the drawings, the apparatus is shown as comprising a pair of 90° crossed loop antennae 1 and 2, connected to supply a radio frequency carrier current to balanced modulators 3 and 4 of generally conventional construction. The balanced modulators are fed by modulation currents in phase displaced relation, for example in phase quadrature, from a modulation current source 5 operating at any desired low frequency, for example, 100 cycles per second. The modulation source 5 is shown connected directly to the balanced modulator 3, and to the modulator 4 through a phase shifter 6 producing, for purposes of example, a 90° phase shift of the currents of modulation frequency.

The balanced modulators operate in a conventional manner to produce currents of side band frequencies while suppressing the carrier wave or waves as the case may be. The side band currents from the balanced modulators 3 and 4 are combined in an output coil 7, the outputs of the balanced modulators being connected in parallel to the coil 7. The carrier wave or waves received by the crossed loops 1 and 2 are also received by a non-directional antenna 8 and are resupplied to the side bands in the coil 7 by means of a coil 9 inductively coupled to the coil 7. A pickup coil 11 inductively coupled with the coils 7 and 9 feeds the products from the balanced modulators and the non-directional antenna (the side bands from the modulators plus the re-supplied carrier wave or waves) to a demodulator 12 where the resultant modulated carrier wave is demodulated to produce a current of the modulation frequency.

It is well known, as evidenced by Luck Patent No. 2,208,378 of July 16, 1940, that the phase angle between the currents of modulation frequency in the output of the demodulator 12 and the current supplied by the source 5, is indicative of the direction between the plane of either one of the crossed lops, for example the loop 2, and the position of the source of carrier waves. Thus the current of modulation frequency produced by the demodulator 12 is fed to a suitable phase angle meter 13 where it may be compared in phase to the current fed to the balanced modulators by the modulation source 5.

The system described above differs in two important respects from the system disclosed in the above-mentioned Luck patent. The indications are produced on an electro-mechanical indicator, thus reducing space requirements and eliminating considerable apparatus, and the circuits are so adjusted as to compensate for the directional errors such as produced by a metal airplane.

The indicator 13 is shown as comprising field coils 14 and 15 fed in phase quadrature by the modulator source 5 through a reactance 16 and a resistor 17 respectively. The coils 14 and 15 are arranged mechanically to produce a rotating field for an iron armature 18 which is free to rotate in this field. The iron armature is energized to magnetically polarize its ends oppositely by means of a coil 19 fed from the output of the demodulator 12. Thus the iron armature will seek a rest position indicative of the phase between the current of modulation frequency received from the demodulator and the current of modulation frequency fed to the coils 14 and 15 by the modulation source 5. The armature may be in the form of a pointer or may be linked to a suitable pointer to indicate phase or direction from 0° to 360° on a suitable scale. The mechanical construction of the above-described indicator may be comparable to that employed for the well-known iron vane phase meters employed in alternating current power circuits. In Fig. 4 the indicator 13 is shown in front elevation. The calibrated dial is indicated at 13a and the pointer is indicated at 13b.

The crossed loop antennae 1 and 2 are indicated diagrammatically in Figs. 2 and 3 in a typical location on an all-metal airplane 21 having wings 31 and fuselage 32. With reference to the appearance of the structure in plan view (Fig. 2), the loop antennae are preferably located near the intersection of the fuselage and the wings and with the planes of the loop antennae 1 and 2 respectively parallel and perpendicular to the longitudinal axis of the fuselage, the intersection of the planes of the loop antennae being preferably so located as to intersect substantially perpendicularly the longitudinal axis of the fuselage. The non-directional antenna 8, usually comprising a short vertically extending post or rod is usually located on the longitudinal axis of the fuselage at a position removed from the loop antennae.

It has been found that the wings and fuselage act as short circuited turns which produce fields that link the respective loop antennae. Thus the loop 1 whose plane lies parallel to the longitudinal axis of the fuselage is mostly affected by the currents produced in the wings. The loop 2 whose plane lies perpendicular to the longitudinal axis of the fuselage is primarily affected by the currents induced in the fuselage. By inspection of Figs. 2 and 3 it will be noted that the shorted turn produced by the fuselage is more effective in producing currents than the shorted turn produced by the wing. I have found that the effects produced by the wings and fuselage may be compensated for when the loop antennae are located substantially symmetrically with respect to the plan profile of the wings and fuselage, by operating the balanced modulator 4, which is connected to the loop antenna 2, with a higher gain than the balanced modulator 3.

The balanced modulators 3 and 4 are shown respectively provided with suitable gain controls 24 and 25 for varying the amplitude of the side bands produced by a given radio frequency signal introduced into the balanced modulators by the loop antennae. For example, the gain controls may comprise means for varying the control grid or screen grid voltages on the modulating tubes. As another example they may comprise means for varying the plate voltages applied to the modulator tubes. The gain controls 24 and 25 are preferably adapted for concurrent control in opposite directions. The means for effecting concurrent control, comprising any expedient well known in the art, is indicated by the dotted line 26. Thus movement of the gain control 24 to increase the gain of the balanced modulator 3 is accompanied by the movement of the gain control 25 to decrease the gain of the balanced modulator 4. The direction of movement for increased gain is indicated by the arcuate arrows on the gain controls.

In practice the desired relation in gain of the balanced modulators is obtained by tests conducted while the airplane is on the ground. The plane is orientated so that its longitudinal axis and the plane of loop antenna 1 makes a definite known angle with a line joining the intersection of the loop antennae and known radiating station. The system is operated so that the bearing of the radiator may be observed. The relative gain of the modulators is then varied to reduce the difference between the observed bearings and the known bearings to a minimum. This procedure may be repeated for different positions of the airplane or with differently located radiators in order that the most optimum relation between the gains in the modulators may be obtained.

In the preceding I have described a system for obtaining bearings on a single radio station. I have found that with slight modification the system may be used to obtain simultaneous bearings on a plurality of radio stations. Such modification may consist in adding means for demodulating waves associated with additional carrier waves, as by adding additional demodulators in parallel with demodulator 12 of Fig. 1 according to the number of additional stations on which bearings are to be had. For example, I may add a demodulator 31 which is adapted to demodulate carrier waves of different frequencies than those demodulated by demodulator 12.

A suitable phase indicator 32 may be associated with the output of demodulator 31 to compare the phase of the current of modulation frequency with the phase of the current derived from the modulation source 5. The phase indicator 32 may be constructed in the same manner as the indicator 13 and may be connected to the demodulator 31 and the modulation source 5 in the same manner as the indicator 13 is connected to the demodulator 12 and the modulation source 5. Obviously, other demodulators and phase angle indicators may be added to the apparatus in the same manner.

It should be apparent that tuned circuits are associated with the modulators and demodulators for obtaining operation on carrier waves of the desired frequency. When only a single carrier wave is to be received the circuits need only be responsive to a single carrier wave frequency. When a plurality of carrier waves are to be received and separately demodulated, the portion of the circuit before the demodulators is adapted to receive and operate on carrier waves of different frequencies within a band of frequencies, for example 150–400 kc., i. e., it is broadly tuned, while the demodulators are each tuned to select a different carrier frequency while rejecting others, i. e., they are sharply tuned. It should be evident that the number of carrier waves received is limited by the band width to which the circuit before the demodulators can be tuned. This general type of system needs no further description since the same general type of tuning has been employed in radio receivers using untuned radio frequency amplifiers before tuned detector circuits.

Referring to Fig. 5, a plurality of radio transmitters are positioned to radiate carrier waves of different frequencies from the positions indicated at A, B, and C. An airplane equipped with apparatus such as shown in Fig. 1 for giving simultaneous bearings on the three radiators A, B, and C is located at the point 50. The dials of the three phase indicators are represented by the circle 51 and the pointers on the dials which are adapted to represent the locations of the radiators A, B, and C are designated at $a$, $b$, and $c$, respectively. At the position 50 the angular relation between the pointers $a$, $b$, and $c$ correspond to the angles between the dot-dashed lines 52, 53, and 54 joining the point 50 with the respective radiators A, B, and C. In view of the fact that the distances between the radiators A, B, and C and their angular relations are known, the relative angular positions of the pointers $a$, $b$, and $c$ is indicative of the absolute location of the point 50 as will be obvious to those skilled in the art of navigation.

A primary advantage of the arrangement illustrated in Fig. 5 lies in directing an airplane to a particular objective. For example, it may be desirable to direct an airplane to a point 55 for the bombing of an objective at that point. In such a case, the radiators A and B are alined so that the straight line 56 passing through them also passes through the point 55. This alinement may be accomplished by using portable transmitters at A and B, or one of the transmitters may be fixed such as transmitter A, and the transmitter B may be moved to place the line 56 on the objective. When the airplane is on the line 56 as at the point 57, the pointers $a$ and $b$ will show the same phase angle reading, while the pointer $c$ will show a different phase angle reading. The phase difference between the pointer $c$ and the pointers $a$ or $b$ is indicative of the position of the point 57 on the line 56. A particular value of this phase difference will occur at the point 55 indicating that the pilot has reached the point 55.

The type of system described in Fig. 5 is extremely valuable even though the third radiator C and the phase angle indicating means represented by the pointer $c$ is omitted, since the line passing through the radiators A and B produces a clear-cut path which the airplane may follow to an objective which may be located visually or by other means. When the system is operated in this manner the phase angle indicators 13 and 32 may be combined in a single indicating device. For example, the moving systems of each indicating device may be connected to concentric pointers operating on a single indicating dial. If such is the case, a position on the line is indicated when the two pointers give the same phase angle reading. Furthermore, the pointers will show according to the phase angle reading whether the airplane is headed toward or away from the stations A and B.

As another example, the outputs of the demodulators 12 and 31 may be combined in a single phase angle meter, for example, in the meter 13. Thus, the output of the demodulator 12 may be connected to the moving coil 19 as shown and the fixed coil system may be connected to the output of the demodulator 31 instead of the demodulator 5. When the airplane is located on the line 56 the phase angle reading will be zero and deviations from one side to the other of the line will result in increase or decrease, respectively, in the phase angle reading.

It is interesting to note that it is not necessary when the apparatus is used simply to fly along the line 56 to take the same precautions in compensating the apparatus for the directional errors produced by the metal in an airplane, the unsymmetrical positioning of the directional antennae with respect to the plan profile of the airplane, or the difference in gain of the respective balanced modulators, as it is when the apparatus is used to obtain a unique bearing on a single radiator or simultaneous bearings on three or more radiators. It should be obvious that when the plane is flying along the line 56, the directional errors with respect to the radiator A are the same as those with respect to the radiator B, and since the desired indication is the difference between the bearings on the two radiators the errors in the system cancel. It should also be noted that the flying of a course along the line 56 is unaffected by angular headings produced by the wind. The position of the plane on the line is indicated irrespective of the plane's heading.

Uniform scale divisions on the phase angle meters may be used when the modulation currents are supplied to the balanced modulators in phase quadrature, and this relation is preferable when it is desired to obtain bearings on a single radiator or the simultaneous bearing on a plurality of radiators to determine the absolute position of the airplane. For those operations it is desirable that the phase shifter 6 introduce a 90° phase shift in the modulation current supplied to the modulator 4. However, under some circumstances, as for example when the system is used to fly a course such as along the line 56, it may be preferable to supply the modulation currents to the balanced modulators with a phase difference other than 90°, for example 135° or more. This will result in increasing the sensitivity of the indicating instrument by spreading the scale readings over part of the range and will decrease the sensitivity of the instrument by crowding the scale readings over another portion of the range.

By proper arrangement of the apparatus the increased sensitivity may be obtained over that part of the instrument range indicating the on course position.

It should be evident that operation of the system may be obtained without the non-directional antenna 8. Under such circumstances the output of the demodulators will be waves of twice modulation frequency. To obtain a phase angle reading the frequency of the modulation current from the modulation source may be doubled. This may be accomplished as indicated in Fig. 6 by connecting the modulation source 5 to the phase indicator or indicators through a full wave rectifier 61 and tuned transformer 62. A suitable filter may be employed if desired. Without the antenna 8 the phase angle readings are subject to a 180° ambiguity. However, this is not so serious when the indicator is used in connection with a compass to fly a course as defined by the line passing through two spaced radiators operating at different carrier frequencies.

Although I have shown separate demodulators in Fig. 1 it should be apparent that the demodulators may be combined in a single demodulating means adapted to separate the modulation associated with the carrier waves of different frequency. Obviously the phase relation of the current of modulation frequency obtained from the demodulating means may be used in the operation of suitable apparatus such as automatic piloting means and need not be fed to indicating means such as shown herein.

I claim:

1. In combination with an airplane having metal wings and fuselage, a directive radio-receiving system carried on the airplane, comprising: a first loop antenna with its plane substantially parallel to the longitudinal axis of the airplane fuselage; a second loop antenna with its plane substantially at right angles to the plane of the first loop antenna, said antennae being located on the airplane in a position where the error produced by the wings and fuselage is substantially symmetrical about said position; a demodulator; a non-directive antenna; a local source of modulation currents; a first balanced modulator connected to receive carrier currents from the first loop antenna; a second balanced modulator having higher gain than the first balanced modulator and connected to receive carrier currents from the second loop antenna; means for applying modulation currents from said source to said modulators in quadrature phase; means for combining the outputs of said modulators with the carrier currents from said non-directional antenna and feeding them to said demodulator; and phase-angle responsive means connected to the output of the demodulator for producing indications of the phase difference between currents of modulation frequency produced by the modulation source and the currents from the demodulator.

2. In combination with an airplane having metal wings and fuselage, a directive radio-receiving system carried on the airplane, comprising: a first loop antenna with its plane substantially parallel to the longitudinal axis of the airplane fuselage; a second loop antenna with its plane substantially at right angles to the plane of the first loop antenna, said antennae being located on the airplane in a position where the error produced by the wings and fuselage is substantially symmetrical about said position; a demodulator; a non-directive antenna; a local source of modulation currents; a first balanced modulator connected to receive carrier currents from the first loop antenna; a second balanced modulator connected to receive carrier currents from the second loop antenna; means for varying the gains of said modulators concurrently in opposite directions; means for applying modulation currents from said source to said modulators in quadrature phase; means for combining the outputs of said modulators with the carrier currents from said non-directional antenna and feeding them to said demodulator; and phase-angle responsive means connected to the output of the demodulator for producing indications of the phase difference between currents of modulation frequency produced by the modulation source and the currents from the demodulator.

3. In combination with an airplane having metal wings and fuselage, a directive radio-receiving system carried on the airplane, comprising: a first loop antenna with its plane substantially parallel to the longitudinal axis of the airplane fuselage; a second loop antenna with its plane substantially at right angles to the plane of the first loop antenna, said antennae being located on the airplane in a position where the error produced by the wings and fuselage is substantially symmetrical about said position; a demodulator; a non-directive antenna; a local source of modulation currents; a first balanced modulator connected to receive carrier currents from the first loop antenna; a second balanced modulator having higher gain than the first balanced modulator and connected to receive carrier currents from the second loop antenna; means for applying modulation currents from said source to said modulators in quadrature phase; means for combining the outputs of said modulators with the carrier currents from said non-directional antenna and feeding them to said demodulator; and electro-mechanical phase-angle responsive means connected to the output of the demodulator for producing indications of the phase difference between currents of modulation frequency produced by the modulation source and the currents from the demodulator.

4. In combination with an airplane having metal wings and fuselage, a directional radio-receiving system carried on the airplane, comprising: a first antenna having substantially a figure-of-eight horizontal directivity pattern; a second antenna having substantially a figure-of-eight horizontal directivity pattern, said antenna being located with their patterns intersecting substantially at right angles adjacent the intersection of the longitudinal axes of the wings and fuselage and with the horizontal directivity pattern of the first antenna alined for maximum response in a direction substantially along the longitudinal axis of the fuselage; a demodulator; a non-directive antenna; a local source of modulation currents; a first balanced modulator connected to receive carrier currents from the first antenna; a second balanced modulator having higher gain than the first balanced modulator and connected to receive carrier currents from the second antenna; means for applying modulation currents from said source to said modulators in quadrature phase; means for combining the outputs of said modulators with the carrier currents from said non-directional antenna and feeding them to said demodulator; and phase-angle responsive means connected to the output of the demodulator for producing indications of the phase difference between currents of modulation frequency produced by the modulation source and the currents from the demodulator.

5. In the operation of an airplane having metal wings and fuselage of a directional radio-receiving system of the type in which a pair of balanced modulators are fed modulation currents out of phase from a local modulation source and are fed carrier currents from carrier waves intercepted by a pair of loop antennae located in a position on the airplane where the directional errors produced by the airplane are substantially symmetrical with respect to said position, one of said antennae having its plane substantially parallel to the longitudinal axis of the fuselage and the other having its plane substantially perpendicular thereto, the method of minimizing the directional errors introduced by the wings and fuselage, comprising: operating the system to obtain a bearing on a source of carrier waves having a known bearing; and then varying the gain of at least one of the balanced modulators to reduce to a minimum the difference between the bearing obtained and the known bearing.

6. In the operation of an airplane having metal wings and fuselage of a directional radio-receiving system of the type in which a pair of balanced modulators are fed modulation currents in quadrature phase from a local modulation source and are fed carrier currents from carrier waves intercepted by a pair of loop antennae located in a position on the airplane which is substantially symmetrically disposed with respect to the plan profile of the airplane, one of said antennae having its plane substantially parallel to the longitudinal axis of the fuselage and the other having its plane substantially perpendicular thereto, the method of minimizing the directional errors introduced by the wings and fuselage, comprising: operating the system to obtain a bearing on a radiator of carrier waves having a known bearing; varying the gain of at least one of the balanced modulators to reduce to a minimum the difference between the bearing obtained and the known bearing; and repeating the above operation with radiators having different known bearings.

7. In combination with an airplane having metal wings and fuselage, a directive radio-receiving system carried on the airplane, comprising: a pair of loop antennae arranged with their planes substantially at right angles to one another and located on the airplane in such a position that the error produced by the wings and fuselage is substantially symmetrical about said position; a local source of modulation currents; a first balanced modulator connected to receive carrier currents from one of said loop antennae; a second balanced modulator connected to receive carrier currents from the other loop antennae; means for varying the gain of one of said modulators in relation to the gain of the other modulator; means for applying modulation currents from said source to said modulators in quadrature phase; a demodulator; means for combining the outputs of said modulators and feeding them to said demodulator; and phase-angle responsive means connected to the output of the demodulator for producing indications of the phase difference between currents of modulation frequency produced by the modulation source and the currents from the demodulator.

8. In the operation on an airplane having metal wings and fuselage of a directional radio-receiving system of the type in which a pair of balanced modulators are fed modualtion currents out of phase from a local modulation source and are fed carrier currents from carrier waves intercepted by a pair of loop antennae located in a position on the airplane where the directional errors produced by the airplane are substantially symmetrical with respect to said position, said antennae having their planes substantially perpendicular to one another, the method of minimizing the directional errors introduced by the wings and fuselage, comprising: operating the system to obtain a bearing on a source of carrier waves having a known bearing; and then varying the gain of one of said modulators relative to the gain of the other modulator to reduce to a minimum the difference between the bearing obtained and the known bearing.

PAUL J. HOLMES.